(12) United States Patent
Wakayama

(10) Patent No.: US 12,039,787 B2
(45) Date of Patent: Jul. 16, 2024

(54) RECOGNITION DEVICE, MOVING OBJECT, RECOGNITION METHOD, AND STORAGE MEDIUM

(71) Applicant: HONDA MOTOR CO., LTD., Tokyo (JP)

(72) Inventor: Ryoji Wakayama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 269 days.

(21) Appl. No.: 17/582,046

(22) Filed: Jan. 24, 2022

(65) Prior Publication Data

US 2022/0262134 A1  Aug. 18, 2022

(30) Foreign Application Priority Data

Feb. 18, 2021  (JP) ................................ 2021-024376

(51) Int. Cl.
| | | |
|---|---|---|
| *G06V 20/58* | (2022.01) | |
| *G06V 10/56* | (2022.01) | |
| *G06F 3/14* | (2006.01) | |
| *G06T 7/00* | (2017.01) | |

(52) U.S. Cl.
CPC ............ *G06V 20/584* (2022.01); *G06V 10/56* (2022.01); *B60W 2420/403* (2013.01); *G06F 3/14* (2013.01); *G06T 7/97* (2017.01)

(58) Field of Classification Search
None
See application file for complete search history.

(56) References Cited

U.S. PATENT DOCUMENTS

| | | | | |
|---|---|---|---|---|
| 2015/0304539 | A1* | 10/2015 | Kristensen | ........... H04N 23/745 348/148 |
| 2022/0141368 | A1* | 5/2022 | Herman | ................. H04N 7/181 348/207.99 |
| 2022/0398853 | A1* | 12/2022 | Nishimura | ......... G08G 1/09623 |
| 2022/0398923 | A1* | 12/2022 | Nishimura | ........... G06V 20/584 |

FOREIGN PATENT DOCUMENTS

JP  2009-061871 A  3/2009

* cited by examiner

*Primary Examiner* — Peter D Nolan
*Assistant Examiner* — Michael F Whalen
(74) *Attorney, Agent, or Firm* — Thomas| Horstemeyer, LLP

(57) ABSTRACT

The present invention provides a recognition device that is mounted on a moving object and recognizes a lighting situation of a traffic signal, the recognition device comprising: an imaging unit that periodically images an external environment of the moving object; at least one processor with a memory comprising instructions cause the at least one processor to at least: sequentially detect, for each image periodically obtained by the imaging unit, a lighting mode of the traffic signal included in the image; and determine, in a case where a same lighting mode of the traffic signal is continuously detected for a predetermined time, the lighting mode as a lighting situation of the traffic signal, wherein the predetermined time is twice or more as long as an imaging cycle of the imaging unit.

12 Claims, 8 Drawing Sheets

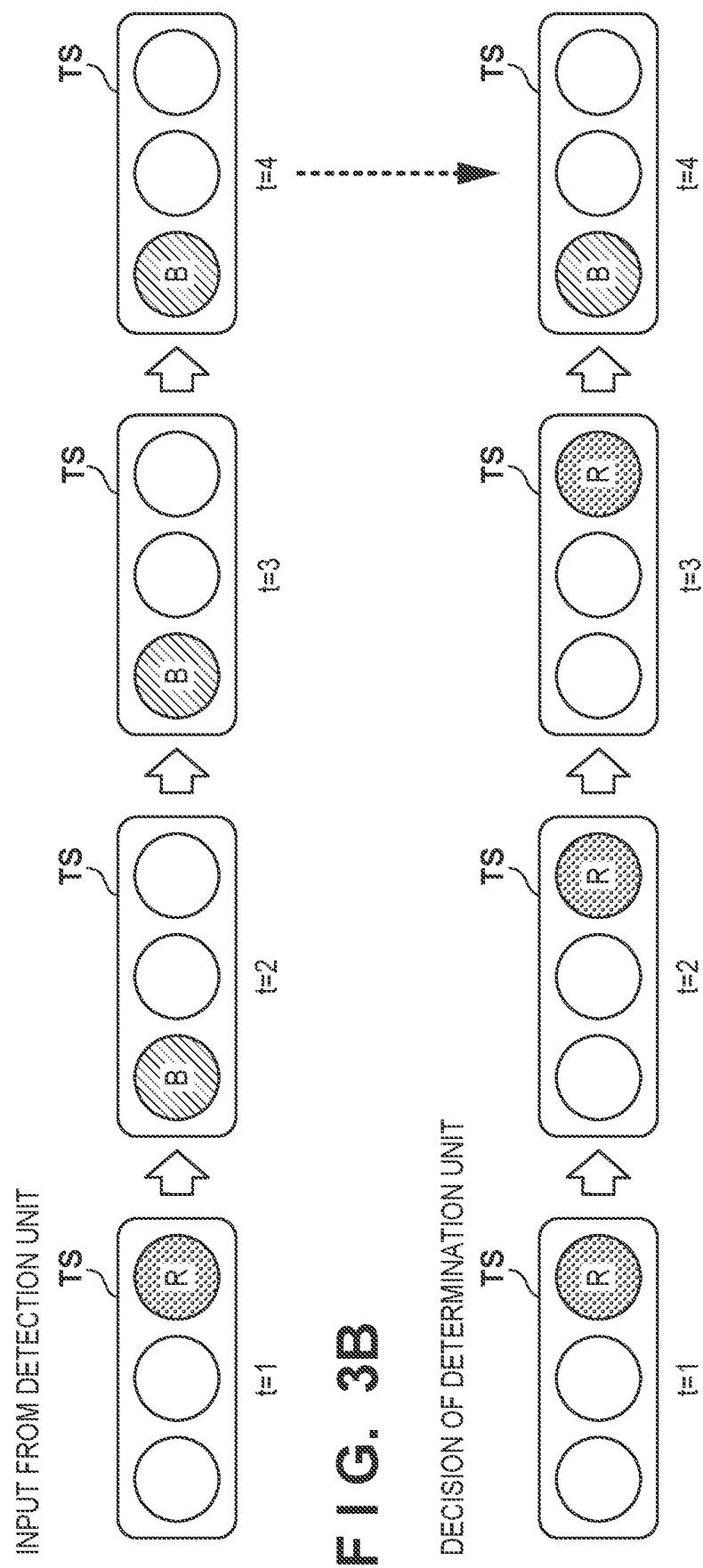

FIG. 6

|  | CURRENT | | | | NEXT TIME | |
|---|---|---|---|---|---|---|
|  | COLOR DISPLAY | DISPLAY ARROW | | | DISPLAY | SCHEDULE CHANGE |
|  |  | LEFT TURN | STRAIGHT | RIGHT TURN |  |  |
| TRAFFIC SIGNAL TS1 | RED | ON | ON | OFF | RED | AFTER 30 SECONDS |
| TRAFFIC SIGNAL TS2 | RED | ON | ON | OFF | RED | AFTER 45 SECONDS |
| TRAFFIC SIGNAL TS3 | RED | ON | ON | OFF | RED | AFTER 10 SECONDS |
| ⋮ | | | | | | |

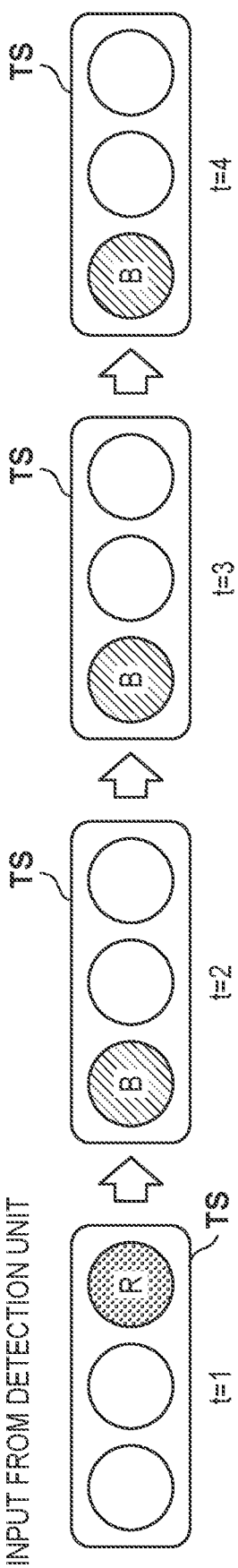
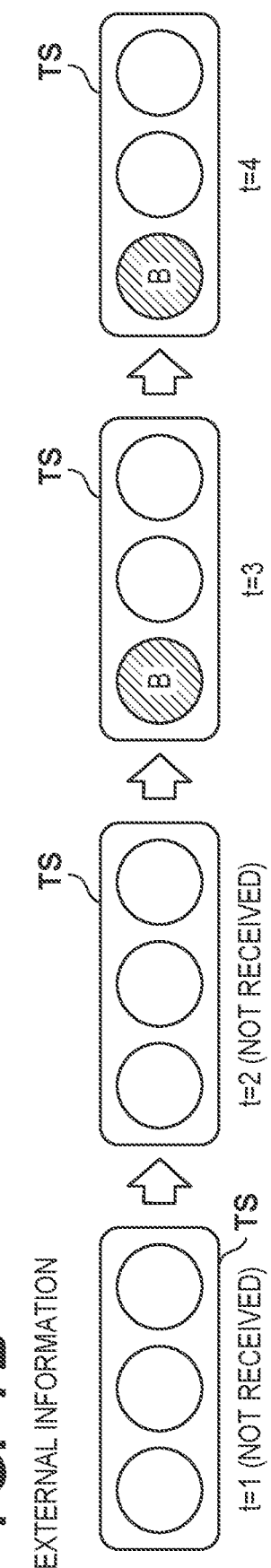
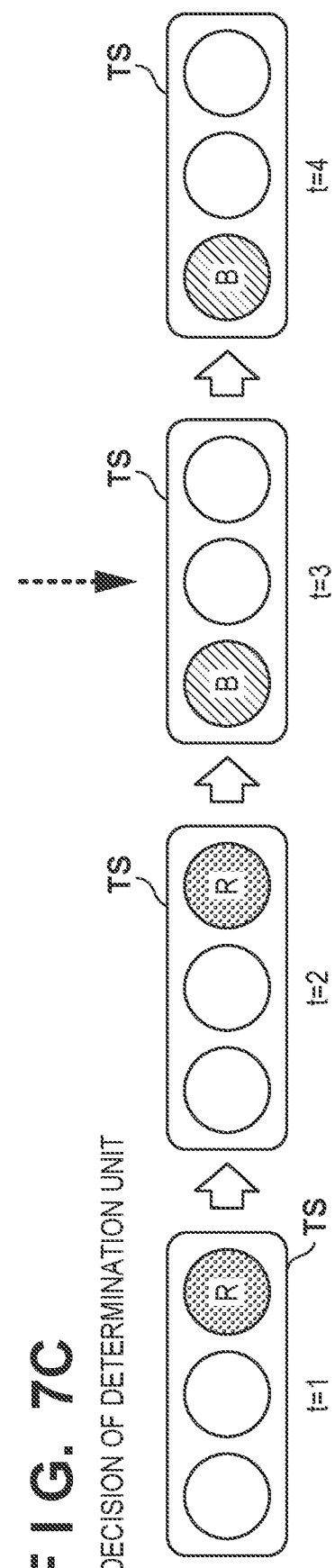

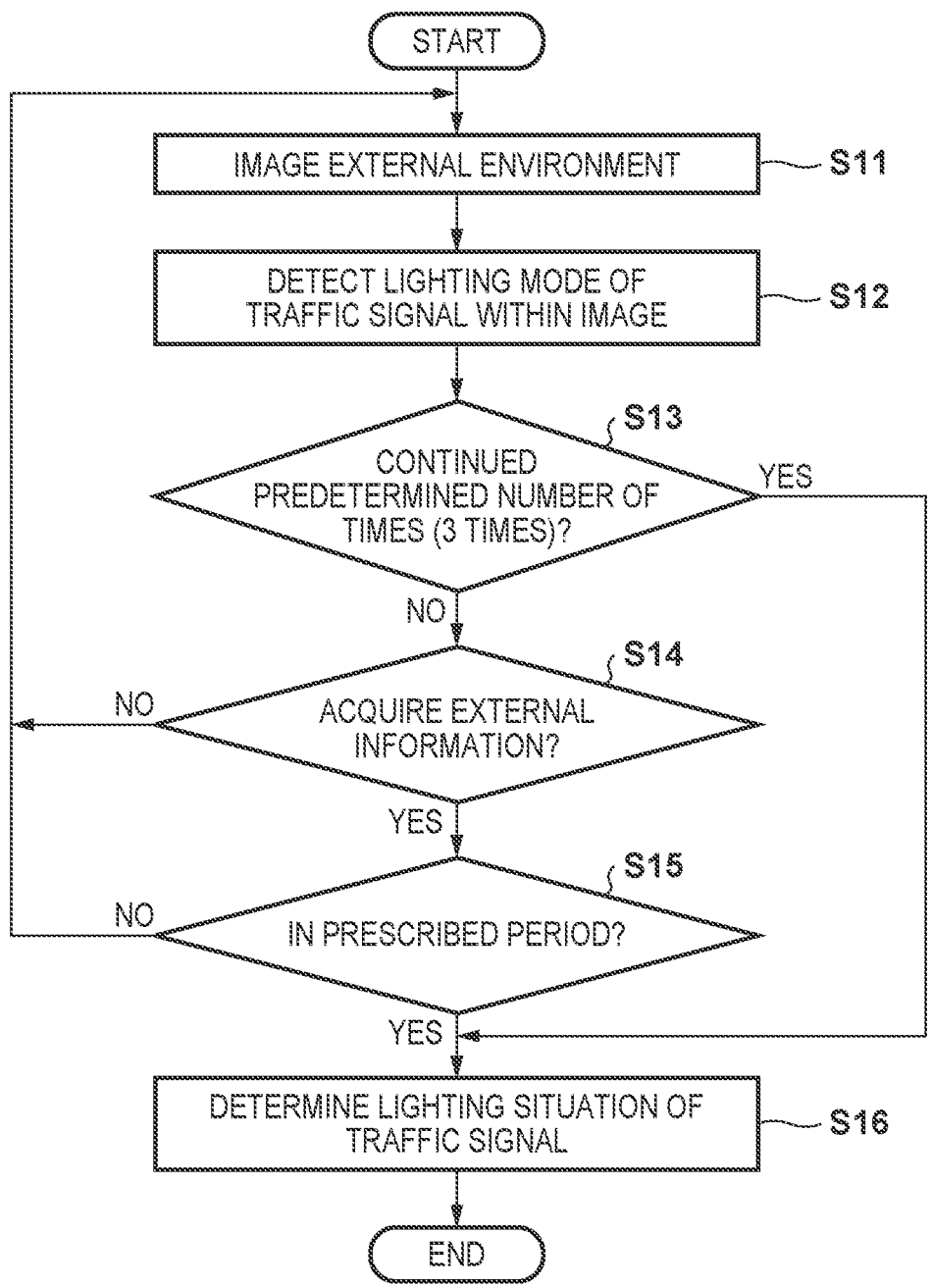

RECOGNITION DEVICE, MOVING OBJECT, RECOGNITION METHOD, AND STORAGE MEDIUM

CROSS-REFERENCE TO RELATED APPLICATION(S)

This application claims priority to and the benefit of Japanese Patent Application No. 2021-024376 filed on Feb. 18, 2021, the entire disclosure of which is incorporated herein by reference.

BACKGROUND OF THE INVENTION

Field of the Invention

The present invention relates to a recognition device, a moving object, a recognition method, and a storage medium.

Description of the Related Art

Japanese Patent Laid-Open No. 2009-61871 discloses a technique in which recognition results of signal recognition by a camera and signal recognition acquired by wireless communication are switched therebetween depending on a vehicle speed, and either of the recognition results is displayed on a display in a vehicle.

In a device that recognizes a lighting situation of a traffic signal based on an image obtained by an imaging unit (camera), erroneous recognition may occur due to a difference between an imaging cycle of the imaging unit and a lighting cycle of the traffic signal, or the like. Therefore, it is desirable to improve reliability when recognizing the lighting situation of the traffic signal using the imaging unit.

SUMMARY OF THE INVENTION

The present invention provides a technology capable of improving reliability of a lighting situation of a traffic signal recognized by using an imaging unit, for example.

According to one aspect of the present invention, there is provided a recognition device that is mounted on a moving object and recognizes a lighting situation of a traffic signal, the recognition device comprising: an imaging unit that periodically images an external environment of the moving object; at least one processor with a memory comprising instructions, that when executed by the at least one processor, cause the at least one processor to at least: sequentially detect, for each image periodically obtained by the imaging unit, a lighting mode of the traffic signal included in the image; and determine, in a case where a same lighting mode of the traffic signal is continuously detected for a predetermined time, the lighting mode as a lighting situation of the traffic signal, wherein the predetermined time is twice or more as long as an imaging cycle of the imaging unit.

Further features of the present invention will become apparent from the following description of exemplary embodiments with reference to the attached drawings.

BRIEF DESCRIPTION OF THE DRAWINGS

FIGS. 3A and 3B are schematic diagrams for explaining recognition processing;

FIG. 6 is a diagram illustrating an example of external information supplied from an external communication apparatus;

FIGS. 7A to 7C are schematic diagrams for explaining recognition processing; and FIG. 8 is a flowchart illustrating the recognition processing.

DESCRIPTION OF THE EMBODIMENTS

Figure 1:
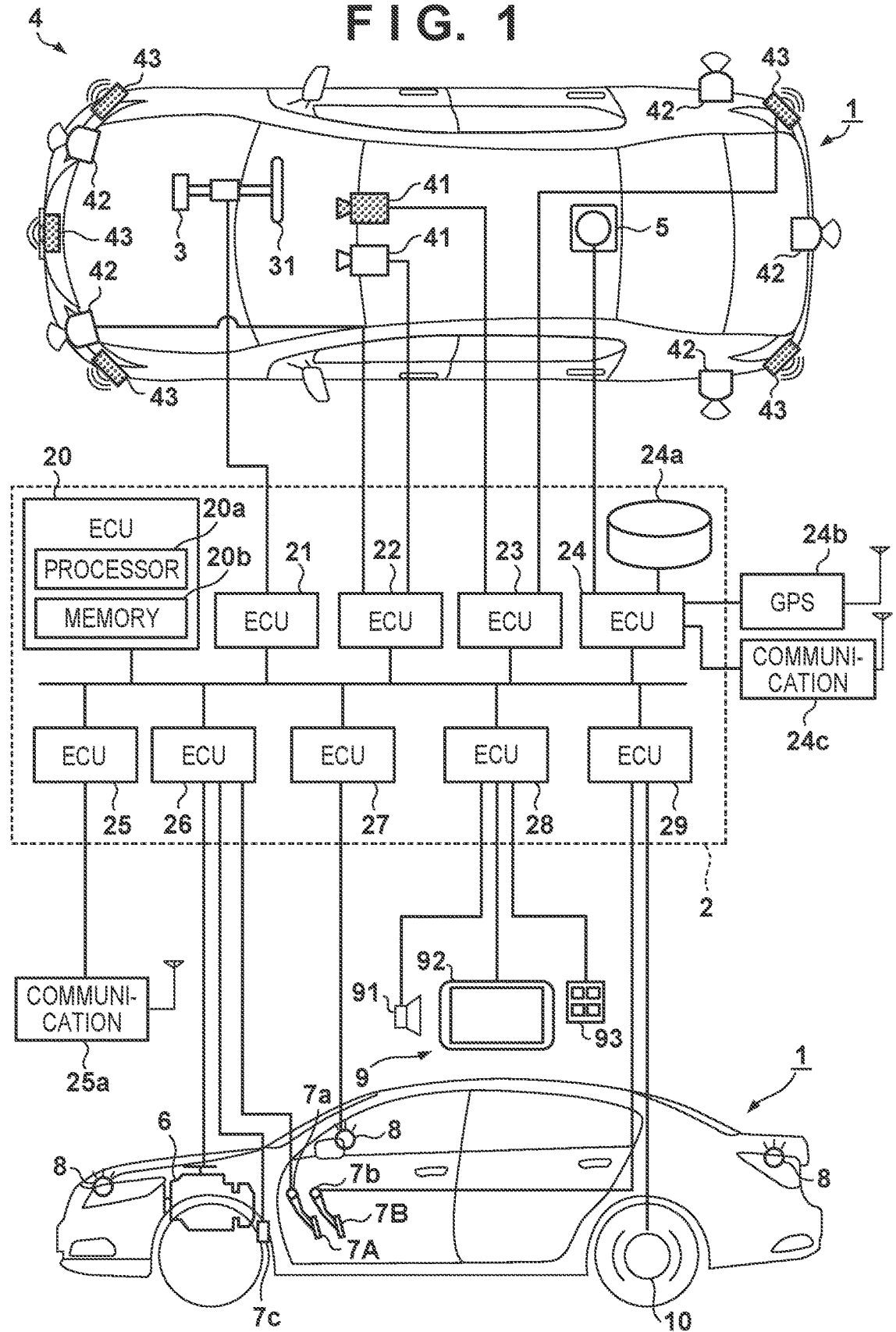
FIG. 1 is a block diagram illustrating a control device of a vehicle.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

Hereinafter, a recognition device of a first embodiment according to the present invention will be described. A recognition device according to the present invention is a device that is mounted on a moving object and recognizes a lighting situation (lighting state) of a traffic signal using an imaging unit (camera) that images an external environment of the moving object. Examples of the moving object may include a vehicle traveling on a road. Hereinafter, an example will be described in which the recognition device according to the present invention is applied to (mounted on) a four-wheeled vehicle as the vehicle, but the recognition device according to the present invention can also be applied to a vehicle other than a four-wheeled vehicle such as a straddle type vehicle (motorcycle, tricycle).

First, an overall control system of a vehicle 1 will be described with reference to FIG. 1. FIG. 1 is a block diagram illustrating a control device 2 of the vehicle 1. In FIG. 1, an outline of the vehicle 1 is illustrated in a plan view and a side view, and a sedan-type four-wheeled passenger vehicle is exemplified as the vehicle 1.

The control device 2 controls each component of the vehicle 1. The control device 2 includes a plurality of electronic control units (ECUs) 20 to 29 communicably connected by an in-vehicle network. Each ECU includes a processor represented by a CPU, a storage device such as a semiconductor memory, an interface with an external device, and the like. The storage device stores programs executed by the processor, data used for processing performed by the processor, and the like. Each ECU may include a plurality of processors, storage devices, interfaces, and the like. For example, the ECU 20 includes a processor 20a and a memory 20b. Processing by the ECU 20 is executed by the processor 20a executing a command included in the program stored in the memory 20b. Alternatively, the ECU 20 may include a dedicated integrated circuit such as an application-specific integrated circuit (ASIC) for executing processing by the ECU 20. The same applies to other ECUs.

Hereinafter, functions and the like assigned to each of the ECUs 20 to 29 will be described. Note that the number of ECUs and the functions assigned to the ECUs can be designed as appropriate, and can be subdivided or integrated, as compared with the present embodiment.

The ECU 20 executes vehicle control related to automated driving of the vehicle 1 (self-vehicle) according to the present embodiment. In automated driving, at least one of the steering and a vehicle speed (acceleration and deceleration) of the vehicle 1 is automatically controlled. In the present embodiment, an example will be described in which both the steering and the vehicle speed of the vehicle 1 are automatically controlled.

The ECU 21 controls an electric power steering device 3. The electric power steering device 3 includes a mechanism that steers front wheels in accordance with a driver's driving operation (steering operation) on a steering wheel 31. In addition, the electric power steering device 3 includes a motor that exerts a driving force for assisting the steering operation or automatically steering the front wheels, a sensor that detects a steering angle, and the like. When the driving state of the vehicle 1 is automated driving, the ECU 21 automatically controls the electric power steering device 3 in response to an instruction from the ECU 20 and controls the traveling direction of the vehicle 1.

The ECUs 22 and 23 control detection units 41 to 43 that detect the surrounding situation of the vehicle, and perform information processing on detection results. The detection units 41 are each an imaging device that periodically images an external environment of the vehicle 1 by imaging (hereinafter, may be referred to as cameras 41). In the present embodiment, the cameras 41 are attached to a vehicle interior side of the windshield at a front portion of the roof of the vehicle 1 so as to be able to capture an image of ahead of the vehicle 1. By analyzing (performing image processing of) the images captured by the cameras 41, it is possible to analyze a target such as a traffic signal located ahead of the vehicle 1, and to extract display of the traffic signal and a division line (white line or the like) of a lane on a road.

The detection units 42 (lidar detection units) are each a light detection and ranging (LIDAR) (hereinafter, may be referred to as lidars 42), and detect a target around the vehicle 1 and measure a distance to the target by light. In the present embodiment, five lidars 42 are provided, one at each corner portion of a front portion of the vehicle 1, one at the center of a rear portion of the vehicle 1, and one at each side of the rear portion of the vehicle 1. The detection units 43 (radar detection units) are each a millimeter-wave radar (hereinafter, may be referred to as radars 43), and detect a target around the vehicle 1 and measure a distance to the target by radio waves. In the present embodiment, five radars 43 are provided, one at the center of the front portion of the vehicle 1, one at each corner portion of the front portion of the vehicle 1, and one at each corner portion of the rear portion of the vehicle 1.

The ECU 22 controls one camera 41 and each lidar 42 and performs information processing on the detection results. The ECU 23 controls the other camera 41 and each radar 43 and performs information processing on the detection results. Since two sets of devices for detecting the surrounding situation of the vehicle are provided, the reliability of the detection results can be improved, and since different types of detection units such as a camera, a lidar, and a radar are provided, the surrounding environment of the vehicle can be analyzed in multiple ways. In the present embodiment, each of the ECU 22 and the ECU 23 can function as a detection unit that sequentially detects, for each image periodically obtained by the camera 41, a lighting mode of a traffic signal included in the image. Here, the display of the traffic signal may include color display (lighting colors (red, green, and yellow)) of the traffic signal for indicating whether traveling of the vehicle is permitted, and arrow display of the traffic signal for indicating a travelable direction of the vehicle.

The ECU 24 controls a gyro sensor 5, a global positioning system (GPS) sensor 24b, and a communication device 24c, and performs information processing of detection results or a communication result. The gyro sensor 5 detects a rotational motion of the vehicle 1. The course of the vehicle 1 can be determined based on the detection result of the gyro sensor 5, the wheel speed, and the like. The GPS sensor 24b detects the current location of the vehicle 1. The communication device 24c performs wireless communication with a server that provides map information and traffic information, and acquires these pieces of information. The communication device 24c performs wireless communication, for example, with an information providing server of a system for monitoring a traffic condition of a road such as Vehicle Information and Communication System (VICS) (registered trademark), and acquires traffic information indicating a traffic condition of a road on which a self-vehicle M is traveling or a road on which the self-vehicle M is scheduled to travel. The traffic information includes the following types of information regarding a set route: traffic jam information, information regarding time required to pass through a traffic jam point, and traffic hazard information such as information regarding a broken-down vehicle/road construction, information regarding speed regulation/lane regulation, and the like.

The ECU 24 can access a database 24a of map information constructed in the storage device, and the ECU 24 searches for a route from the current location to a destination, and the like. The database 24a can be arranged on a network, and the communication device 24c can access the database 24a on the network to acquire information.

The ECU 25 includes a communication device 25a capable of performing vehicle-to-vehicle communication, road-to-vehicle communication, or communication with an information processing device such as a smartphone. For example, the communication device 25a can perform wireless communication with other surrounding vehicles, exchange information between the vehicles, or exchange information by wireless communication with an external information processing device or the like. In the present embodiment, the communication device 25a and the communication device 24c can each function as a reception unit that receives information indicating a lighting situation of a traffic signal (lighting information regarding color display and arrow display) by wireless communication.

The ECU 26 controls a power plant 6. The power plant 6 is a mechanism that outputs a driving force for rotating driving wheels of the vehicle 1 and includes, for example, an engine and a transmission. Note that the configuration of the power plant 6 is not limited to this example, and includes an electric vehicle using an electric motor as a power source, a hybrid vehicle including an engine and an electric motor, and the like. Among them, the electric vehicle is driven using electric power discharged by a battery such as a secondary battery, a hydrogen fuel cell, a metal fuel cell, or an alcohol fuel cell, for example.

For example, the ECU 26 controls the output of the engine in response to a driving operation (accelerator operation or acceleration operation) of the driver detected by an operation detection sensor 7a provided on an accelerator pedal 7A, and switches the gear ratio of the transmission based on information regarding a vehicle speed detected by a vehicle speed sensor 7c and the like. When the driving state of the vehicle 1 is automated driving, the ECU 26 automatically controls the power plant 6 in response to an instruction from the ECU 20 and controls the vehicle speed (speed, acceleration and deceleration of the vehicle 1).

The ECU 27 controls lighting devices (headlights, taillights, and the like) including direction indicators 8 (blinkers). In the example of FIG. 1, the direction indicators 8 are provided at the front portion, the door mirrors, and the rear portion of the vehicle 1.

The ECU 28 controls an input/output device 9. The input/output device 9 outputs information to occupants including the driver and receives an input of information from the occupants. A sound output device 91 notifies the occupants of information by sound. A display device 92 notifies the driver of information by displaying an image. The display device 92 is arranged in front of the driver seat and the passenger seat, for example, and constitutes a touch panel type instrument panel or the like functioning as a human-machine interface.

For example, on a route from the current location to a destination searched for by the ECU 24, the ECU 28 performs display control to display, on the display device 92, road information acquired from location information regarding the vehicle 1 (self-vehicle) and map information, and including information regarding a plurality of lanes on which the vehicle 1 is currently traveling. Furthermore, the ECU 28 controls the sound output device 91 and the display device 92 to provide the driver with sound, map display, and guidance information by sound.

Note that, although the sound and the display have been exemplified here, information notification may also be made by using vibration or light. In addition, information notification may be made by using a combination of some of sound, display, vibration, and light. Furthermore, the combination or the notification mode may vary depending on the level (for example, the degree of urgency) of information that should be notified.

An input device 93 is arranged at a position operable by the driver, and includes a switch group for inputting an instruction to the vehicle 1 and a sound input device to which a voice of an occupant is input.

The ECU 29 controls a brake device 10 and a parking brake (not illustrated). The brake device 10 is, for example, a disc brake device, and is provided on each wheel of the vehicle 1 to decelerate or stop the vehicle 1 by applying resistance to the rotation of the wheel. The ECU 29 controls the operation of the brake device 10 in response to a driving operation (brake operation) of the driver detected by an operation detection sensor 7b provided on a brake pedal 7B, for example. When the driving state of the vehicle 1 is automated driving, the ECU 29 automatically controls the brake device 10 in response to an instruction from the ECU 20 and controls the deceleration and stop of the vehicle 1. The brake device 10 and the parking brake can also be operated to maintain a stopped state of the vehicle 1. In addition, in a case where the transmission of the power plant 6 includes a parking lock mechanism, the parking lock mechanism can also be operated to maintain the stopped state of the vehicle 1.

[Configuration of Recognition Device]

Figure 2:
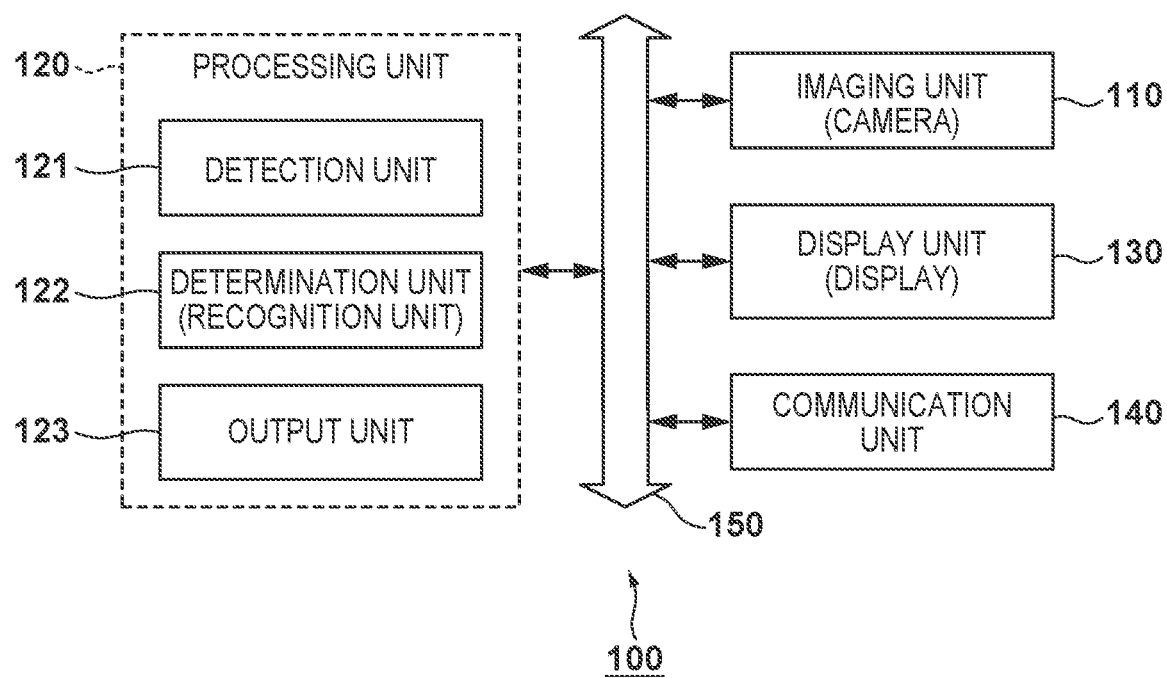
FIG. 2 is a block diagram illustrating an example configuration of a recognition device.
Figure 4A:
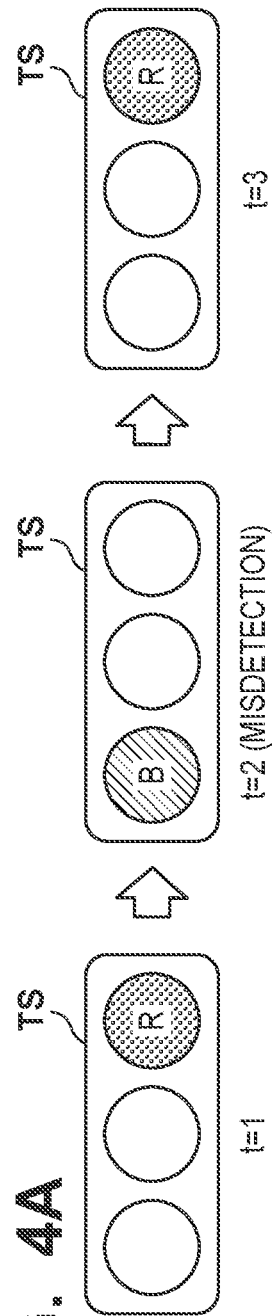
FIGS. 4A and 4B are diagrams for explaining erroneous detection and non-detection by a detection unit.
Figure 4B:
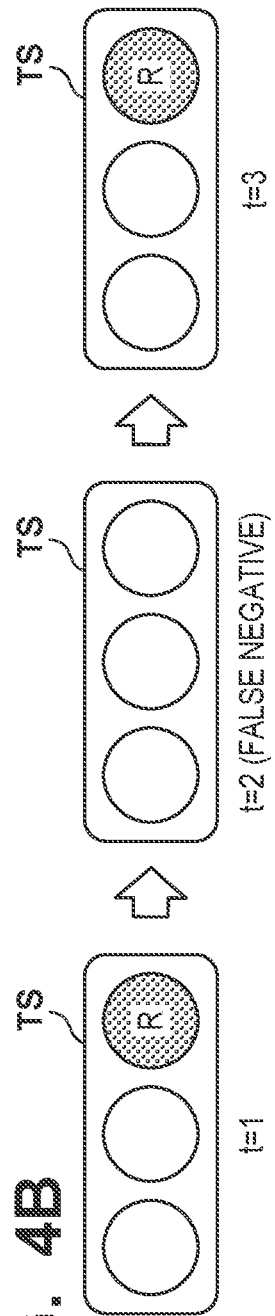

Next, an example configuration of a recognition device 100 of the present embodiment will be described with reference to FIG. 2. FIG. 2 is a block diagram illustrating an example configuration of the recognition device 100 of the present embodiment. As described above, the recognition device 100 is a device that recognizes a lighting situation (lighting state) of a traffic signal using a camera, and may include an imaging unit (image capturing unit) 110, a processing unit 120, a display unit 130, and a communication unit 140 connected to be communicable with one another via a system bus 150.

The imaging unit 110 is, for example, the camera 41 in FIG. 1, and periodically images the external environment of the vehicle 1 (i.e. captures an image of the external environment of the vehicle 1) at a predetermined imaging cycle (for example, 60 msec). The imaging unit 110 may be understood as an external environment sensor that acquires external environment information regarding a target including an object or a sign present around the vehicle 1. Note that, hereinafter, the imaging unit 110 may be referred to as a camera 110.

The processing unit 120 is, for example, the control device 2 (ECUs 20 to 29) in FIG. 1, and can be constituted with a computer including a processor represented by a CPU, a storage device such as a semiconductor memory, an interface with an external device, and the like. In the present embodiment, a program (hereinafter, may be referred to as a recognition program) for recognizing a lighting state of a traffic signal is stored in the storage device, and the processor executes a command included in the recognition program, and thereby recognition processing of the lighting situation of the traffic signal can be executed by the processing unit 120. The processing unit 120 of the present embodiment may include a detection unit 121, a determination unit 122 (approval unit), and an output unit 123.

The detection unit 121 is, for example, the ECU 23 and the ECU 24 in FIG. 1, and sequentially detects, for each image periodically obtained by the camera 110, a lighting mode of a traffic signal included in the image. Specifically, by performing known image processing on the image obtained by the camera 110, the detection unit 121 can specify (extract) a traffic signal as a target (object) included in the image and can detect a lighting mode of the specified traffic signal. The lighting mode of the traffic signal may include, for example, what color of light of color display (green, yellow, and red) of the traffic signal is turned on, whether arrow display of the traffic signal is turned on, and the like.

The determination unit 122 is, for example, the ECU 20 in FIG. 1, and determines (approves, recognizes) the lighting situation of the traffic signal based on the lighting mode of the traffic signal detected by the detection unit 121. In the present embodiment, when the same lighting mode of the traffic signal is continuously detected for a predetermined time by the detection unit 121, the determination unit 122 determines (approves, recognizes) the lighting mode continuously detected for the predetermined time as a current (actual) lighting situation of the traffic signal. The predetermined time can be set to be twice or more as long as an imaging cycle of the camera 110. The predetermined time may be defined by a predetermined number of times the same lighting mode of the traffic signal is continuously detected by the detection unit 121 with respect to the images periodically obtained by the camera 110. In other words, the predetermined number of times is the number of images (that is, the number of times of imaging) in which the same lighting mode is continuously detected by the detection unit 121, and can be set to be two or more. Hereinafter, an example will be described in which the determination unit 122 makes a determination using a predetermined number of times, and the predetermined number of times is set to be three.

The output unit 123 is, for example, the ECU 28 in FIG. 1, and outputs information (hereinafter, may be referred to as lighting information) indicating the lighting situation of the traffic signal determined by the determination unit 122 to the display unit 130, and causes the display unit 130 to display the lighting information. The output unit 123 may output the lighting information obtained from the determination unit 122 to a unit in charge of automated driving control in the ECU 20 so that the lighting information is used in automated driving (vehicle control) of the vehicle 1 executed by the ECU 20.

The display unit 130 is, for example, a display corresponding to the display device 92 in FIG. 1, and displays the lighting information output from the output unit 123. The communication unit 140 is, for example, the communication device 24c and the communication device 25a in FIG. 1, and receives, by wireless communication, information indicating a lighting situation of a traffic signal from an external communication apparatus (transmission apparatus) installed on a road on which the vehicle 1 travels. The external communication apparatus can be configured as, for example, a communication apparatus of a beacon system or a cellular system using a mobile communication network standardized by a communication standard for mobile phones. The communication unit 140 can acquire information indicating lighting situations of a plurality of traffic signals present around the vehicle 1 (as an example, a plurality of traffic signals arranged in the traveling direction of the vehicle 1) from the external communication apparatus. Hereinafter, the information received from the external communication apparatus may be referred to as external information.

[Outline of Processing]

Next, an outline of recognition processing executed by the processing unit 120 will be described. As described above, regarding the lighting mode of the traffic signal detected by the detection unit 121 from the images periodically obtained by the camera 110, when the same lighting mode is continuously detected a predetermined number of times (here, three times), the processing unit 120 (determination unit 122) determines the continuously detected lighting state as the current (actual) lighting situation of the traffic signal.

FIGS. 3A and 3B are schematic diagrams for explaining recognition processing for recognizing a lighting situation of a traffic signal TS in the processing unit 120 (determination unit 122). FIG. 3A illustrates, in time series, information input to the determination unit 122, that is, information indicating a lighting mode of the traffic signal TS detected by the detection unit 121. Specifically, FIG. 3A illustrates, in time series, results of detecting the lighting mode of the traffic signal TS included in images obtained by the camera 110 by performing image processing on the images in the detection unit 121. FIG. 3B illustrates, in time series, information output from the determination unit 122, that is, information (lighting information) indicating the lighting situation of the traffic signal TS determined by the determination unit 122. Specifically, FIG. 3B illustrates, in time series, lighting information regarding the traffic signal TS determined by the determination unit 122 based on the lighting mode of the traffic signal TS detected by the detection unit 121. Here, "t" in FIGS. 3A and 3B represents a time series number of an image periodically obtained by the camera 110, that is, a time series number of information indicating the lighting mode of the traffic signal TS detected by the detection unit 121 from each image, but may be understood as time corresponding to an imaging cycle of the camera 110 (in other words, a detection cycle of the detection unit 121). "t=1, 2, 3, or 4" is only used to represent, in time series, a part of the recognition processing continuously performed by the processing unit 120 extracted therefrom and does not represent that the part is obtained first, second, third, or fourth in the recognition processing. The same applies to "t" in FIGS. 4A and 4B and FIGS. 7A to 7C described later.

When t=1, the detection unit 121 detects that the lighting mode of the traffic signal TS is red lighting R from an image obtained by the camera 110, and the determination unit 122 also determines that the lighting situation of the traffic signal TS is red lighting R. Next, when t=2, the detection unit 121 detects that the lighting mode of the traffic signal TS is green lighting B from an image obtained next by the camera 110 as illustrated in FIG. 3A. However, at that stage, since the number of times the lighting mode (green lighting B) of the traffic signal TS is continuously detected by the detection unit 121 is still one and has not reached the predetermined number of times (three times), the determination unit 122 holds the lighting situation (red lighting R) of the traffic signal TS previously determined as illustrated in FIG. 3B.

When t=3, the detection unit 121 detects that the lighting mode of the traffic signal TS is green lighting B from an image obtained next by the camera 110 as illustrated in FIG. 3A. However, at that stage, since the number of times the lighting mode (green lighting B) of the traffic signal TS is continuously detected by the detection unit 121 is still two and has not reached the predetermined number of times (three times), the determination unit 122 holds the lighting situation (red lighting R) of the traffic signal TS previously determined as illustrated in FIG. 3B. Next, when t=4, the detection unit 121 detects that the lighting mode of the traffic signal TS is green lighting B from an image obtained next by the camera 110 as illustrated in FIG. 3A. At that stage, since the number of times the lighting mode (green lighting B) of the traffic signal TS is continuously detected by the detection unit 121 reaches the predetermined number of times (three times), the determination unit 122 determines that the lighting situation of the traffic signal TS is green lighting B as illustrated in FIG. 3B.

By executing the above recognition processing, the determination unit 122 of the present embodiment can accurately determine (recognize) the lighting situation of the traffic signal TS even when there occurs erroneous detection and/or non-detection by the detection unit 121. That is, it is possible to avoid or reduce determination of the lighting situation of the traffic signal TS based on the erroneous detection and/or non-detection by the detection unit 121. What is meant by the erroneous detection by the detection unit 121 is that, as indicated by t=2 in FIG. 4A, although the red light of the traffic signal TS is actually turned on, the detection unit 121 detects green lighting B. What is meant by the non-detection by the detection unit 121 is that, as indicated by t=2 in FIG. 4B, although the (red) light of the traffic signal TS is actually turned on, the detection unit 121 does not detect the lighting of the traffic signal TS. In addition, the information (lighting information) indicating the lighting situation of the traffic signal TS determined by the determination unit 122 by the recognition processing described above can be supplied to the display unit 130 (display) by the output unit 123 and displayed on the display unit 130. As described above, the lighting information output from the determination unit 122 may be used for automated driving (vehicle control) of the vehicle 1 executed by the ECU 20.

Here, when external information indicating a lighting situation of a traffic signal is received from the external communication apparatus by the communication unit 140, the determination unit 122 of the present embodiment may determine the lighting situation of the traffic signal TS based on the external information. Such external information obtained from the external communication apparatus tends to be more reliable as information indicating a lighting situation of a traffic signal. Therefore, even if a time (the number of times) when the same lighting mode of the traffic signal TS is continuously detected by the detection unit 121 is less than a predetermined time (predetermined number of times), when the communication unit 140 receives external information from the external communication apparatus, the determination unit 122 can determine the lighting situation of the traffic signal based on the external information.

Figure 5:
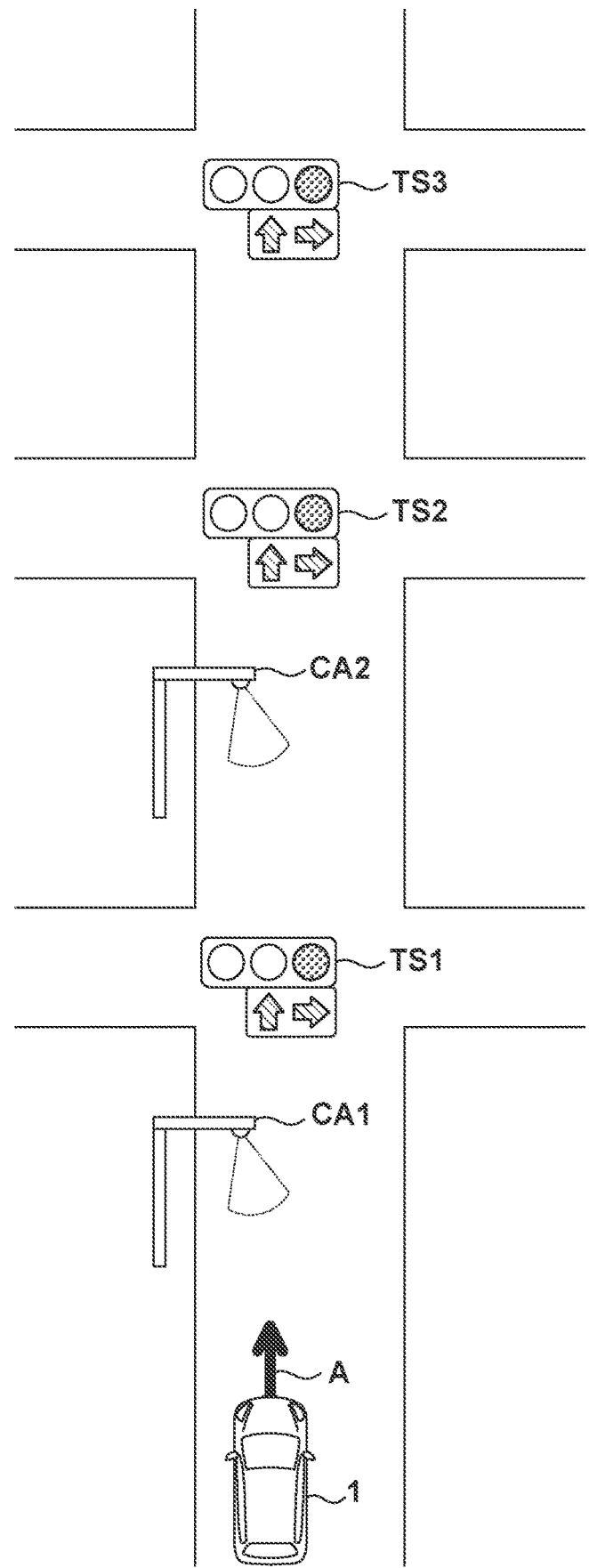
FIG. 5 is a diagram schematically illustrating a road on which the vehicle travels.

FIG. 5 schematically illustrates a road on which the vehicle 1 travels. In the example illustrated in FIG. 5, the traveling direction of the vehicle 1 is the direction of arrow A, and a plurality of traffic signals TS1 to TS3 are arranged in the traveling direction of the vehicle 1. Each of the traffic signals TS1 to TS3 includes color display (lighting colors (red, green, and yellow)) for indicating whether traveling is permitted, straight arrow display for permitting traveling straight, and right turn arrow display for permitting turning right. In addition, a plurality of external communication apparatuses CA1 and CA2 are arranged on the road. The external communication apparatus CA1 is arranged in front of the traffic signal TS1, and the external communication apparatus CA2 is arranged in front of the traffic signal TS2 (between the traffic signal TS1 and the traffic signal TS2). Each of the external communication apparatuses CA1 and CA2 is an apparatus that transmits (provides), to the vehicle 1 by a beacon system, external information indicating lighting situations of a plurality of traffic signals (including traffic signals TS1 to TS3) present around the vehicle 1. As an example, the external communication apparatus CA1 arranged in front of the traffic signal TS1 supplies (transmits) external information indicating the lighting situation of each of the traffic signals TS1 to TS3 to the vehicle 1 as illustrated in FIG. 6. FIG. 6 illustrates an example of the external information supplied from the external communication apparatus CA1.

FIGS. 7A to 7C are schematic diagrams for explaining recognition processing in the processing unit 120 (determination unit 122). FIGS. 7A to 7C each illustrate an example of recognition processing for recognizing the lighting situation of the traffic signal TS based not only on the lighting mode of the traffic signal TS detected by the detection unit 121 but also on the external information obtained from the external communication apparatus CA. FIG. 7A illustrates, in time series, information input to the determination unit 122, that is, information indicating the lighting mode of the traffic signal TS detected by the detection unit 121. FIG. 7B illustrates, in time series, the external information indicating the lighting mode of the traffic signal TS supplied from the external communication apparatus (for example, CA1). FIG. 7C illustrates, in time series, information output from the determination unit 122, that is, lighting information indicating the lighting situation of the traffic signal TS determined by the determination unit 122.

When t=1, the detection unit 121 detects that the lighting mode of the traffic signal TS is red lighting R from an image obtained by the camera 110, and the determination unit 122 also determines that the lighting situation of the traffic signal TS is red lighting R. At that stage, the external information is not received yet. Next, when t=2, the detection unit 121 detects that the lighting mode of the traffic signal TS is green lighting B from an image obtained next by the camera 110 as illustrated in FIG. 7A. At that stage, the external information is not received yet. In addition, the number of times the lighting mode (green lighting B) of the traffic signal TS is continuously detected by the detection unit 121 is still one and has not reached the predetermined number of times (three times). Therefore, as illustrated in FIG. 7C, the determination unit 122 holds the lighting situation (red lighting R) of the traffic signal TS previously determined.

When t=3, the detection unit 121 detects that the lighting mode of the traffic signal TS is green lighting B from an image obtained next by the camera 110 as illustrated in FIG. 7A. On the other hand, the communication unit 140 receives, from the external communication apparatus CA1, external information indicating that the lighting situation of the traffic signal TS is green lighting B. At that stage, the number of times the lighting mode (green lighting B) of the traffic signal TS is continuously detected by the detection unit 121 is still two and has not reached the predetermined number of times (three times), but the external information indicating green lighting B is obtained from the external communication apparatus as illustrated in FIG. 7B. Therefore, as illustrated in FIG. 7C, the determination unit 122 preferentially uses the external information to determine that the lighting situation of the traffic signal TS is green lighting B. Next, when t=4, the lighting mode of the traffic signal TS detected by the detection unit 121 from an image obtained next by the camera 110 is green lighting B (see FIG. 7A), and the external information also indicates green lighting B (see FIG. 7B). Therefore, as illustrated in FIG. 7C, the determination unit 122 determines that the lighting situation of the traffic signal TS is green lighting B. By further using the external information supplied from the external communication apparatus as described above, it is possible to accurately and quickly determine (recognize) the lighting situation of the traffic signal TS.

[Flow of Recognition Processing]

Next, a flow of recognition processing executed by the processing unit 120 will be described. FIG. 8 is a flowchart illustrating the recognition processing executed by the processing unit 120. The flowchart illustrated in FIG. 8 is repeatedly executed, and can be newly started from step S11 even after step S16 ends.

In step S11, the processing unit 120 causes the camera 110 to image the external environment (in the present embodiment, ahead) of the vehicle 1, thereby acquiring an image of the external environment of the vehicle 1. In step S12, the processing unit 120 (detection unit 121) detects the lighting mode of the traffic signal TS included in the image obtained by the camera 110. For example, the detection unit 121 can detect, as the lighting mode, the lighting color of the traffic signal TS in the image by performing known image processing on the image obtained by the camera 110. Next, in step S13, the processing unit 120 (determination unit 122) determines whether the same lighting mode has been continuously detected a predetermined number of times (in the present embodiment, three times) regarding the lighting mode of the traffic signal TS detected by the detection unit 121. If the same lighting mode has been continuously detected the predetermined number of times, the process proceeds to step S16, and if the same lighting mode has not been continuously detected the predetermined number of times, the process proceeds to step S14.

In step S14, the processing unit 120 (determination unit 122) determines whether the external information has been acquired from the external communication apparatus CA by the communication unit 140. As described above, the external information is information indicating the lighting situation of the traffic signal TS, and can be acquired, for example, by a beacon system or a cellular system. If the external information has been acquired, the process proceeds to step S15, and if the external information has not been acquired, the process returns to step S11. Next, in step S15, the processing unit 120 (determination unit 122) determines whether an elapsed time from the acquisition of the external information by the communication unit 140 in step S14 is within a prescribed period. Since the lighting situation of the traffic signal TS changes from moment to moment, if the lighting situation of the traffic signal TS in the acquired external information is out-of-date one, it becomes difficult to accurately determine the current lighting situation of the traffic signal TS in step S16 described later. Therefore, in this step S15, a prescribed period (prescribed time) is provided as a period of validity in which the external information can be used, and it is determined whether the elapsed time from the acquisition of the external information is within the prescribed period. The prescribed period is preferably set based on information indicating a time during which the same lighting color of the traffic signal TS remains turned on (for example, green lighting time and red lighting time). The information indicating the time during which the same lighting color remains turned on may be, for example, information regarding time indicated in "scheduled change" in FIG. 6. The prescribed period may be set for each traffic signal TS, or may be commonly set for a plurality of traffic signals TS.

Here, as described above, the external information received from the external communication apparatus CA may include information indicating lighting situations of the plurality of traffic signals TS present around the vehicle 1. In that case, the determination unit 122 can determine the current lighting situation regarding, among the plurality of traffic signals TS, a traffic signal TS of which the elapsed time from the acquisition of the external information is within the prescribed period based on the external information. On the other hand, the current lighting situation regarding, among the plurality of traffic signals TS, a traffic signal TS of which the elapsed time from the acquisition of the external information is not within the prescribed period is preferably determined based on the detection result of the detection unit 121 without using the external information.

In step S16, the processing unit 120 (determination unit 122) determines (approves, recognizes) the lighting situation of the traffic signal TS. For example, when the same lighting mode of the traffic signal TS is continuously detected the predetermined number of times (three times) by the detection unit 121, the determination unit 122 determines the lighting mode detected by performing measurement the predetermined number of times as the current (actual) lighting situation of the traffic signal TS. On the other hand, when the external information is received from the external communication apparatus CA and the elapsed time from the reception of the external information is within the prescribed period, the determination unit 122 preferentially uses the external information to determine the lighting situation of the traffic signal TS included in the external information as the current (actual) lighting situation of the traffic signal TS.

Here, in the above example, if the lighting state is within the prescribed period as a result of checking the prescribed period in step S15, the lighting state is determined in step S16, but as another method, the processing of the prescribed period may not be performed in step S15, and traffic signal information in which the lighting state detected by the detection unit 121 in step S16 matches the external information received from the external communication apparatus CA may be determined as the lighting state. For example, in a case where the detection unit 121 detects the green color of the traffic signal, and the external information received from the external communication apparatus CA also indicates that the traffic signal is green, the lighting state of the traffic signal may be determined to be green without considering the prescribed period.

Furthermore, even in a case where the prescribed time is not reflected, when display information regarding the traffic signal is received from the external communication apparatus CA, it is possible to utilize the fact that a lighting color and a traveling direction indicated by a traffic signal arranged in the traveling direction, and in addition thereto, a minimum lighting time and a maximum lighting time thereof are transmitted from the external communication apparatus CA. For example, there is a case of communication including the following information: a lighting color is green, the minimum lighting time is zero seconds, and the maximum lighting time is 10 seconds. In that case, although traffic signal information is successfully acquired by the communication, there is a possibility that the lighting color of the traffic signal of interest will be changed to yellow after zero seconds, and it is possible to determine the certainty, for example, to determine that the information is uncertain as lighting prediction information regarding the traffic signal.

As described above, by performing display after comparing the external information (traffic signal information) received by the communication unit 140 and the information obtained by the imaging unit 110, highly accurate display can be performed. At the time of comparison, a reference time may be set in consideration of the minimum lighting time. That is, when a minimum reference time (minimum lighting time) is longer than an estimated time until a moving object enters an intersection, the information received by the communication unit 140 (external information) is prioritized, and on the other hand, when the minimum reference time is shorter, the information received by the communication unit 140 and the information obtained by the detection unit 121 may be compared with each other.

As described above, the recognition device 100 of the present embodiment detects, for each image periodically obtained by the camera 110, the lighting mode of the traffic signal TS in the image, and when the same lighting mode is continuously detected a predetermined number of times, the recognition device 100 determines the lighting mode as the current (actual) lighting situation of the traffic signal TS. As a result, even when erroneous detection or non-detection occurs at the time of detecting the lighting mode of the traffic signal TS from the image, it is possible to avoid or reduce determination (recognition) of the current lighting situation of the traffic signal TS based on the erroneous detection or the non-detection. That is, it is possible to accurately and precisely recognize the current lighting situation of the traffic signal TS and to improve the reliability of the lighting situation of the traffic signal recognized using the imaging unit.

Second Embodiment

In the first embodiment, the example has been described in which the above recognition processing is performed on the color display of the traffic signal TS, but the above recognition processing can also be performed on the arrow display of the traffic signal TS. However, it is generally difficult to detect the arrow display by known image processing, and erroneous detection or non-detection by the detection unit 121 is likely to occur. Therefore, when the recognition processing is performed on the arrow display, instead of the predetermined time used for the color display, a second predetermined time set to a time longer than the predetermined time is preferably used. Similarly, instead of the predetermined number of times used for the color display, a second predetermined number of times set to a number of times larger than the predetermined number of times may be used. Note that the configuration of the recognition device 100 and the contents of processing other than those described above are similar to those of the first embodiment, and thus the description thereof will be omitted here.

Third Embodiment

As described in the first embodiment, the lighting information (determination result) indicating the lighting situation of the traffic signal determined by the determination unit 122 may be used for automated driving by the ECU 20. When the lighting information is used for automated driving as described above, the lighting information may be required to be highly precise. Therefore, when the lighting information is used for automated driving, the predetermined time is preferably set to be longer (alternatively, the predetermined number of times is set to be larger) than that when the lighting information is not used for automated driving. For example, in a case where the predetermined number of times is set to three when the lighting information is used only for display on the display unit 130, the predetermined number of times is preferably set to four or a value larger than that when the lighting information is used for automated driving. As a result, the lighting information can be obtained more precisely, so that the accuracy of the automated driving can be improved and discomfort to an occupant can be reduced. Note that the configuration of the recognition device 100 and the contents of processing other than those described above are similar to those of the first embodiment, and thus the description thereof will be omitted here. In the present embodiment, the second embodiment can also be applied.

Fourth Embodiment

The image obtained by the camera 110 may include, in addition to the traffic signal TS that performs indication regarding traveling in the traveling direction of the vehicle 1, a plurality of traffic signals including a traffic signal that performs indication regarding traveling in a direction different from the traveling direction of the vehicle 1 and a traffic signal at an intersection located further ahead. When the plurality of traffic signals are included in the image obtained by the camera 110 as described above, the detection unit 121 preferably obtains, for each traffic signal, the degree of certainty (likelihood, reliability) indicating certainty that it is a traffic signal in the traveling direction of the vehicle 1, and detects a lighting mode of a traffic signal of which the degree of certainty is highest among the plurality of traffic signals. For example, the detection unit 121 can calculate the area of a lighting portion in the image for each of the plurality of traffic signals included in the image, and can employ the calculated size of the area as the degree of certainty. By calculating the degree of certainty as described above, it is possible to specify the traffic signal TS in the traveling direction of the vehicle 1 even when the plurality of traffic signals are included in the image. The degree of certainty may be improved by integrating information regarding the plurality of traffic signals and then collating the integrated information with other map information or information obtained by communication. Note that the configuration of the recognition device 100 and the contents of processing other than those described above are similar to those of the first embodiment, and thus the description thereof will be omitted here. In the present embodiment, the second and third embodiments can also be applied.

Summary of Embodiments

1. The recognition device according to the above embodiment is:
    a recognition device (for example, 100) that is mounted on a moving object (for example, 1) and recognizes a lighting situation of a traffic signal (for example, TS), the recognition device including:
    an imaging unit (for example, 110) that periodically images an external environment of the moving object;
    a detection unit (for example, 121) that sequentially detects, for each image periodically obtained by the imaging unit, a lighting mode of the traffic signal included in the image; and
    a determination unit (for example, 122) that, when a same lighting mode of the traffic signal is continuously detected for a predetermined time by the detection unit, determines the lighting mode as a lighting situation of the traffic signal, in which
    the predetermined time is twice or more as long as an imaging cycle of the imaging unit.

According to this embodiment, even when erroneous detection or non-detection occurs at the time of detecting the lighting mode of the traffic signal from the image, it is possible to avoid or reduce determination (recognition) of the current lighting situation of the traffic signal based on the erroneous detection or the non-detection. That is, it is possible to accurately and precisely recognize the current lighting situation of the traffic signal and to improve the reliability of the lighting situation of the traffic signal recognized using the imaging unit.

2. In the above embodiment,
    when the same lighting mode of the traffic signal is not continuously detected for the predetermined time by the detection unit, the determination unit holds a lighting situation of the traffic signal previously determined.

According to this embodiment, the information indicating the lighting situation of the traffic signal is not changed as long as the current lighting situation of the traffic signal cannot be reliably determined, so that the accuracy can be improved.

3. In the above embodiment,
    the predetermined time is defined by a predetermined number of times the same lighting mode of the traffic signal is continuously detected by the detection unit, and
    the predetermined number of times is two or more.

According to this embodiment, even in a case where the predetermined number of times is used instead of the predetermined time, it is possible to accurately and precisely recognize the current lighting situation of the traffic signal as in a case where the predetermined time is used.

4. In the above embodiment,
    further included is an output unit (for example, 123) that outputs information indicating the lighting situation of the traffic signal determined by the determination unit to a display unit (for example, 130).

According to this embodiment, it is possible to notify a user (for example, a driver) of the lighting situation of the traffic signal.

5. In the above embodiment,
    the determination unit performs the determination of the lighting situation of the traffic signal using the predetermined time on color display of the traffic signal that indicates whether traveling of the moving object is permitted.

According to this embodiment, it is possible to accurately and precisely recognize the lighting situation of the color display (lighting colors (red, green, and yellow)) of the traffic signal.

6. In the above embodiment,
when determining a lighting situation of arrow display of the traffic signal indicating a travelable direction of the moving object, the determination unit uses, instead of the predetermined time, a second predetermined time longer than the predetermined time.

According to this embodiment, it is possible to accurately and precisely recognize the lighting situation even for the arrow display of the traffic signal which is difficult to detect by known image processing, and of which erroneous detection or non-detection is likely to occur.

7. In the above embodiment,
further included is a communication unit (for example, 140) that receives information related to lighting of the traffic signal by wireless communication, and
even when a time during which the same lighting mode of the traffic signal is continuously detected by the detection unit is less than the predetermined time, the determination unit determines the lighting situation of the traffic signal based on the information when the communication unit receives the information.

According to this embodiment, information received by wireless communication tends to be more reliable than information detected from an image, so that by actively using such information, it is possible to more accurately and precisely recognize the lighting situation of the traffic signal.

8. In the above embodiment,
the communication unit receives, from an external communication apparatus (for example, CA) installed on a road on which the moving object travels, the information regarding a plurality of traffic signals present around the moving object, and
the determination unit
determines a lighting situation regarding, among the plurality of traffic signals, a traffic signal of which an elapsed time from reception of the information by the communication unit is within a prescribed period based on the information, and
determines the lighting situation regarding a traffic signal of which the elapsed time is not within the prescribed period based on a result of detection by the detection unit.

According to this embodiment, it is possible to appropriately recognize the lighting situation of each traffic signal depending on a situation of information acquisition by the recognition device.

9. In the above embodiment,
when a plurality of traffic signals are included in an image obtained by the imaging unit, the detection unit obtains a degree of certainty for each of the traffic signals, the degree of certainty indicating certainty that the traffic signal is a traffic signal in the traveling direction of the moving object, and detects a lighting mode of a traffic signal of which the degree of certainty is highest among the plurality of traffic signals.

According to this embodiment, even when the plurality of traffic signals are included in the image acquired by the imaging unit, it is possible to specify a traffic signal in the traveling direction of the vehicle and to detect the lighting mode of the specified traffic signal. That is, it is possible to recognize the lighting situation of the traffic signal in the traveling direction of the vehicle.

10. In the above embodiment,
when a determination result of the lighting situation of the traffic signal is used for automatic control of steering and a vehicle speed of the moving object, the determination unit sets the predetermined time longer than that when the determination result is not used for the automatic control.

According to this embodiment, when the determination result of the lighting situation of the traffic signal is used for automated driving, the determination result can be obtained more precisely, so that the accuracy of the automated driving can be improved and discomfort to an occupant can be reduced.

The invention is not limited to the foregoing embodiments, and various variations/changes are possible within the spirit of the invention.

What is claimed is:

1. An apparatus that is mounted on a moving object, comprising:
a camera configured to periodically capture an image of an external environment of the moving object;
a controller configured to:
perform, for each image periodically captured by the camera, image processing of specifying a traffic signal in the image and detecting a lighting mode of the specified traffic signal;
determine the same lighting mode continuously obtained by the image processing for a predetermined time period, as a lighting situation of the specified traffic signal; and
control the moving object based on the determined lighting situation of the specified traffic signal,
wherein the predetermined time period is twice or more as long as an image capturing cycle of the camera, and
wherein the controller is configured to adopt a first time period as the predetermined time period in a case of determining the lighting situation of color display of the traffic signal that indicates whether traveling of the moving object is permitted, and adopt a second time period as the predetermined time period in a case of determining the lighting situation of arrow display of the traffic signal indicating a travelable direction of the moving object, the second time period being longer than the first time period.

2. The apparatus according to claim 1, wherein in a case where the same lighting mode is not continuously obtained by the image processing for the predetermined time period, the controller is configured to hold a lighting situation of the traffic signal previously determined.

3. The apparatus according to claim 1, wherein
the predetermined time period is defined by a predetermined number of times the same lighting mode of the traffic signal is continuously obtained by the image processing, and
the predetermined number of times is two or more.

4. The apparatus according to claim 1, wherein the controller is configured to control the moving object to output information indicating the determined lighting situation of the specified traffic signal to a display provided in the moving object.

5. The apparatus according to claim 1, further comprising:
a communication unit that receives information related to lighting of the traffic signal by wireless communication, wherein even in a case where a time period during which the same lighting mode is continuously obtained by the image processing is less than the predetermined time, the controller is configured to determine the lighting situation of the traffic signal based on the information in a case where the communication unit receives the information.

6. The apparatus according to claim 5, wherein
the communication unit receives, from an external communication apparatus installed on a road on which the moving object travels, the information regarding a plurality of traffic signals present around the moving object, and
the controller is configured to:
  determine a lighting situation based on the information, regarding a traffic signal of which an elapsed time from reception of the information by the communication unit is within a prescribed period among the plurality of traffic signals, and
  determine the lighting situation based on the lighting mode obtained by the image processing, regarding a traffic signal of which the elapsed time is not within the prescribed period among the plurality of traffic signals.

7. The apparatus according to claim 1, wherein in a case where a plurality of traffic signals are included in an image captured by the camera, the controller is configured to obtain a degree of certainty for each of the plurality of traffic signals, the degree of certainty indicating certainty that the traffic signal is a traffic signal in the traveling direction of the moving object, and detect a lighting mode of a traffic signal of which the degree of certainty is highest among the plurality of traffic signals.

8. The apparatus according to claim 1, wherein in a case where the determined lighting situation of the traffic signal is used for automatic control of steering and a vehicle speed of the moving object, the controller is configured to set the predetermined time period longer than that when the determined lighting situation is not used for the automatic control.

9. The apparatus according to claim 1, wherein the controller is configured to control automated driving of the moving object based on the determined lighting situation of the specified traffic signal.

10. A moving object comprising the apparatus according to claim 1.

11. A method for controlling a moving object that has a camera configured to periodically capture an image of an external environment of the moving object, comprising:
  performing, for each image periodically captured by the camera, image processing of specifying a traffic signal in the image and detecting a lighting mode of the specified traffic signal;
  determining the same lighting mode continuously obtained by the image processing for a predetermined time period, as a lighting situation of the specified traffic signal; and
  controlling the moving object based on the determined lighting situation of the specified traffic signal,
  wherein the predetermined time period is twice or more as long as an image capturing cycle of the camera, and
  wherein a first time period is adopted as the predetermined time period in a case of determining the lighting situation of color display of the traffic signal that indicates whether traveling of the moving object is permitted, and a second time period is adopted as the predetermined time period in a case of determining the lighting situation of arrow display of the traffic signal indicating a travelable direction of the moving object, the second time period being longer than the first time period.

12. A non-transitory computer-readable storage medium storing a program for causing a computer to execute the recognition method according to claim 11.

* * * * *